United States Patent [19]
Brady

[11] Patent Number: 5,717,849
[45] Date of Patent: Feb. 10, 1998

[54] SYSTEM AND PROCEDURE FOR EARLY DETECTION OF A FAULT IN A CHAINED SERIES OF CONTROL BLOCKS

[75] Inventor: James T. Brady, San Jose, Calif.

[73] Assignee: International Business Machines Corporation, Armonk, N.Y.

[21] Appl. No.: 805,700

[22] Filed: Feb. 25, 1997

Related U.S. Application Data

[63] Continuation of Ser. No. 241,882, May 11, 1994, abandoned.

[51] Int. Cl.$^6$ .................................................... G06F 13/00
[52] U.S. Cl. .............. 395/181; 395/182.05; 395/182.02; 395/180; 395/185.03; 364/243; 364/243.4; 364/243.41
[58] Field of Search .................... 395/700, 650, 395/181, 182.02, 182.05, 180, 180.03; 380/25; 364/243, 243.4, 243.41

[56] References Cited

U.S. PATENT DOCUMENTS

| | | | |
|---|---|---|---|
| 3,676,846 | 7/1972 | Busch | 340/146.1 |
| 4,118,792 | 10/1978 | Struger et al. | 364/900 |
| 4,133,030 | 1/1979 | Huettner et al. | 364/200 |
| 4,400,773 | 8/1983 | Brown et al. | 364/200 |
| 4,543,626 | 9/1985 | Bean et al. | 364/200 |
| 4,630,270 | 12/1986 | Petit et al. | 371/29 |
| 4,881,230 | 11/1989 | Clark et al. | 371/20.1 |
| 5,101,494 | 3/1992 | Bilski et al. | 395/700 |
| 5,208,813 | 5/1993 | Stallmo | 371/10.1 |
| 5,243,607 | 9/1993 | Masson et al. | 371/69.1 |
| 5,390,247 | 2/1995 | Fischer | 380/25 |

OTHER PUBLICATIONS

Microsoft Systems Journal, Sep. 1989, New York—pp.1–13—Ray Duncan—'Design Goals and Implementation of the New High Performance File System'.

Microprocessors and Microsystems, vol. 9, No. 4, May 1985, London GB—pp. 179–183—B. Srinivasan et al.—'Recoverable file system for microprocessor systems'.

A Case for Redundant Arrays of Inexpensive Disks (RAID), David A. Panerson, Garth Gibson, and Randy H. Katz, Jun., 1988, 8 pages.

*Primary Examiner*—Lucien U. Toplu
*Assistant Examiner*—Majid A. Bananakhah
*Attorney, Agent, or Firm*—Ohlandt, Greely, Ruggiero & Perle

[57] ABSTRACT

A software-controlled data processing system employs control blocks, each control block including a data structure that defines at least one control parameter for a data processing action. Plural control blocks are assigned to the data processing action to enable its performance, and each of the plural control blocks has a tag value which, for any set of chained control blocks assigned to the data processing action, exhibit an identical value. The data processing method comprises the steps of: executing the data processing action by accessing each of the plural assigned control blocks in a sequence; comparing tag values contained in sequentially accessed control blocks to determine if the tag values are identical and, if yes, continuing execution of the data processing action and, if no, reporting an anomaly. Such a procedure enables the data processing system to assure that the received, chained control blocks are all assigned to a common data processing action.

10 Claims, 4 Drawing Sheets

SYSTEM AND PROCEDURE FOR EARLY DETECTION OF A FAULT IN A CHAINED SERIES OF CONTROL BLOCKS

This a continuation of application Ser. No. 08/241,882 filed on May 11, 1994, now abandoned.

FIELD OF THE INVENTION

This invention relates to the use of software control blocks to control operations of a data processing system and, more particularly, to a system and procedure for detecting an error in a sequence of control blocks that are chained to provide a macroscopic data processing function.

BACKGROUND OF THE INVENTION

Prior art data processing systems having long used control blocks to enable hardware set up so as to accomplish a data processing function. A control block is a data structure which defines a segment (or segments) of information needed by the data processing system to accomplish a hardware control function. The system's control software includes descriptions of various types of control blocks and enables their construction at various times during the system's operation. The use of such control structures is considered in U.S. Pat. No. 5,101,494 to Bilsky et al. and U.S. Pat. No. 4,133,030 to Huettner.

Various techniques have been employed by prior art data processing systems to detect errors that arise during handling of control (and data) blocks. In U.S. Pat. No. 3,676,846 to Busch, techniques are described for detection of errors during transmission of data blocks. A first technique requires that a transmitter of a block wait until an acknowledgement has been received of correct receipt of the block from the receiver. In the event of an error, a negative acknowledgement is received by the transmitter and retransmission is tried. Busch describes another technique where a series of blocks are transmitted, one after the other, without waiting for acknowledgements. Each transmitted block includes a unique block number and each block correctly received at a receiver is acknowledged using the specific block number. Any data block received that includes a block number that is the same as one which had been acknowledged previously is rejected.

With the availability of low cost microprocessors, distributed data processing systems have come into vogue. Such systems include multiple nodes, each node including a microprocessor. All of the nodes are interconnected via a high speed data network. Efficient operation of such a nodal system is dependent upon an ability to cope with error states and to rapidly recover from such error states without user involvement. Such a nodal system can provide (for example) an array of inexpensive disk drives that insure availability of large quantities of storage for an associated host processor. In such a disk array storage facility, multiple inexpensive disk drives are used to create "logical memory devices" which may be independently assigned and utilized. A disk array system has the potential for higher capacity, greater performance, and better availability than a single physical disk drive per logical memory device system.

While arrays of inexpensive disks exhibit substantial benefits in terms of performance, error states must be handled on a real time basis to enable appropriate functioning of the array. Patterson et al in "A Case For Redundant Arrays of Inexpensive Disks (RAID)" (ACM Sigmod Conference, Chicago, IL, Jun. 1–3, 1988) describe various methods of arranging data across plural disk drives to assure availability of data in the event of failure of one of the disk drives. Such a system is also described in U.S. Pat. No. 5,208,813 to Stallmo. In any system employing a RAID data structure (i.e., data spread across plural disk drives), considerable inter-nodal communications are required and must not be burdened with heavy message handshaking overhead to enable error state detection.

Accordingly, it is an object of this invention to provide an improved error detection procedure and mechanism for a data processing system that employs control blocks.

It is another object of this invention to provide an error detection mechanism for a control block data structure wherein complex bookkeeping is avoided.

SUMMARY OF THE INVENTION

A software-controlled data processing system employs control blocks, each control block including a data structure that defines at least one control parameter for a data processing action. Plural control blocks are assigned to the data processing action to enable its performance, and each of the plural control blocks has a tag value which, for any set of chained control blocks assigned to the data processing action, exhibit an identical value. The data processing method comprises the steps of: executing the data processing action by accessing each of the plural assigned control blocks in a sequence; comparing tag values contained in sequentially accessed control blocks to determine if the tag values are identical and, if yes, continuing execution of the data processing action and, if no, reporting an anomaly. Such a procedure enables the data processing system to assure that the received, chained control blocks are all assigned to a common data processing action.

DETAILED DESCRIPTION OF THE INVENTION

Figure 1:
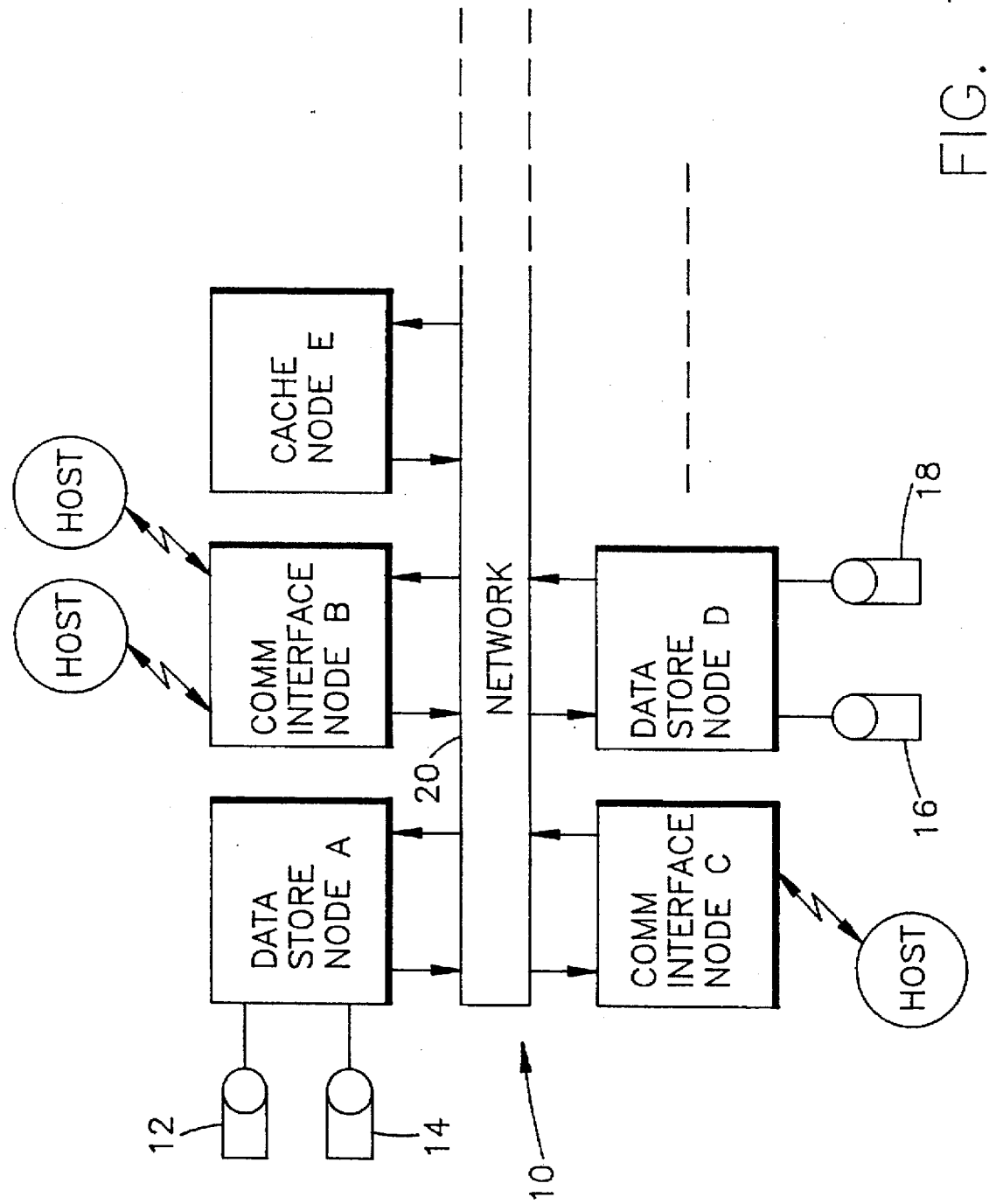
FIG. 1 is a block diagram illustrating a nodal disk array for a host processor.

FIG. 1 illustrates a disk drive array 10 configured as a multi-node network. Nodes A and D are data storage nodes that connect to coupled disk drives 12, 14 and 16, 18, respectively. While only four disk drives are shown, one skilled in the art will realize that disk drive array 10 will include many more disk drives. A pair of communication interface nodes B and C provide input/output communication functions for disk drive array 10. Host processors are coupled to nodes B and C via communication links. Disk drive array 10 further includes a cache node E which provides a temporary storage facility for both input and output data transfers from disk. Disk drive array 10 is expandable by addition of further nodes, all of which are interconnected by a communication network 20.

Figure 2:
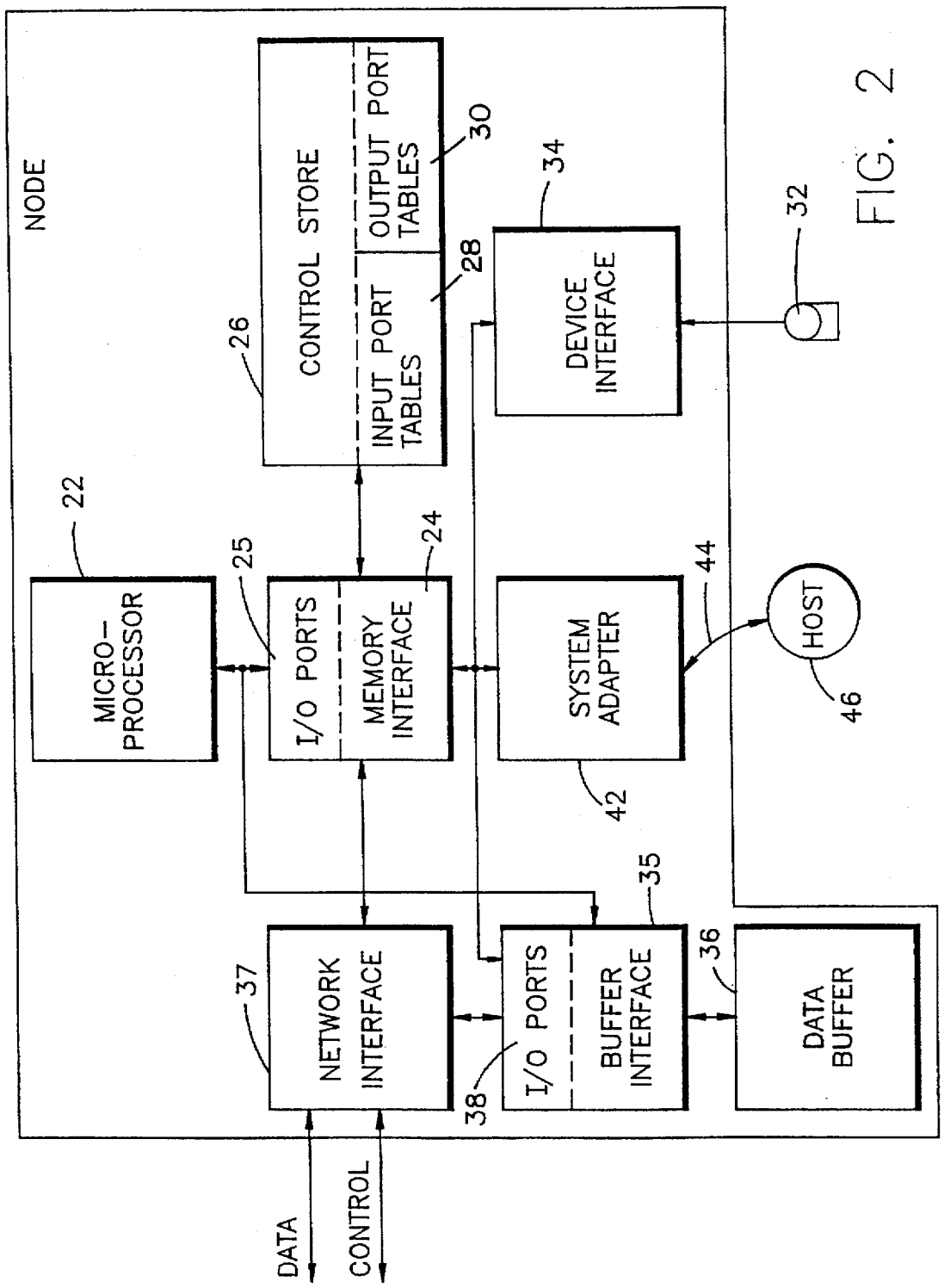
FIG. 2 is a block diagram of an exemplary node employed in the system of FIG. 1.

Each of nodes A–E in FIG. 1 is configured in a standard node arrangement shown in FIG. 2. A node includes a microprocessor 22 that controls the overall functions of the node. A memory interface module 24 controls communications between microprocessor 22 and plural memory modules within the node. Memory interface module 24 also includes input/output hardware 25 for handling of control messages. Control messages are stored in a connected control store 26 which also contains code that controls the operation of microprocessor 22. Among other control code contained within control store 26 is an input port table 28 and an output port table 20. A node includes many logical input/output ports. An input port table 28 and an output port table 30 are provided for each physical input/output port, and entries in those tables correspond to the logical input/output ports.

The node of FIG. 2 includes plural disk drives 32 (only one is shown) that are connected via device interfaces 34 to memory interface 24 and a data buffer interface 35. Data buffer interface 35 connects a data buffer 36 to a network interface 37. Data buffer 36 provides buffering functions for both incoming and outgoing data messages (as contrasted to control messages). Buffer interface 35 further includes input/output hardware ports 38 for handling of data. Input/output hardware ports 38 in buffer interface 35 and input/output hardware ports 25 in memory interface 24 are controlled by entries in input port tables 28 and output port tables 30 in control store 26. Network interface 37 provides interface functions for both incoming and outgoing message transfers.

If the node of FIG. 2 is utilized as cache node, data buffer 36 is larger in size than if the node is configured as a communication interface node or a disk drive storage node. If the node of FIG. 2 is configured as a communication interface node, it further includes a system adapter 42 that enables connection via a communication line 44 to a host processor 46. If the node of FIG. 2 is configured as a data storage node, it will include plural device interfaces 34 and plural connected disk drives 32.

Operations within the node of FIG. 2 are controlled by software-generated control blocks. For any read or write action, plural control blocks are assigned by software working in conjunction with microprocessor 22 to enable setup of the hardware within the node to accomplish the read or write action. For any single read or write, the software assigns plural control blocks. Each control block includes at least one parameter required to enable setup of the hardware to perform a function that is required during the overall data processing action.

To implement an overall data processing action, control blocks are "chained" so that one control block includes a pointer to a next control block, etc. During the course of building and traversing chained control blocks, errors may occur in either the software or hardware which are difficult to track and correct. For instance, an anomaly may occur within the node which causes an error in a pointer contained within a control block. When the hardware accesses the control block, it will see a wrong pointer and an error condition will result. However, the error condition may not be discovered until additional processing has occurred of the data within the control block.

To prevent such a situation, a tag is embedded in each control block data structure that allows the hardware or software using the control block to perform a check to insure that the control block "belongs" to the chain of control blocks required to accomplish the overall data processing action. Each control block in a chain of control blocks has embedded in it a tag field, and at least one common value is assigned to all control blocks involved with a specific data processing action. The tag is fixed length field of any size that is used to identify the instance of the control block. It may be a unique or a non-unique value. Where a control block is required to interact with a plurality of other data structures that are not chained control blocks, but rather are data structures which are sequentially accessed through action of the control block, additional tag values are assigned so as to enable the system to assure that the series of control structures (even though not chained) are properly to be associated with the particular data processing action.

Figure 3:
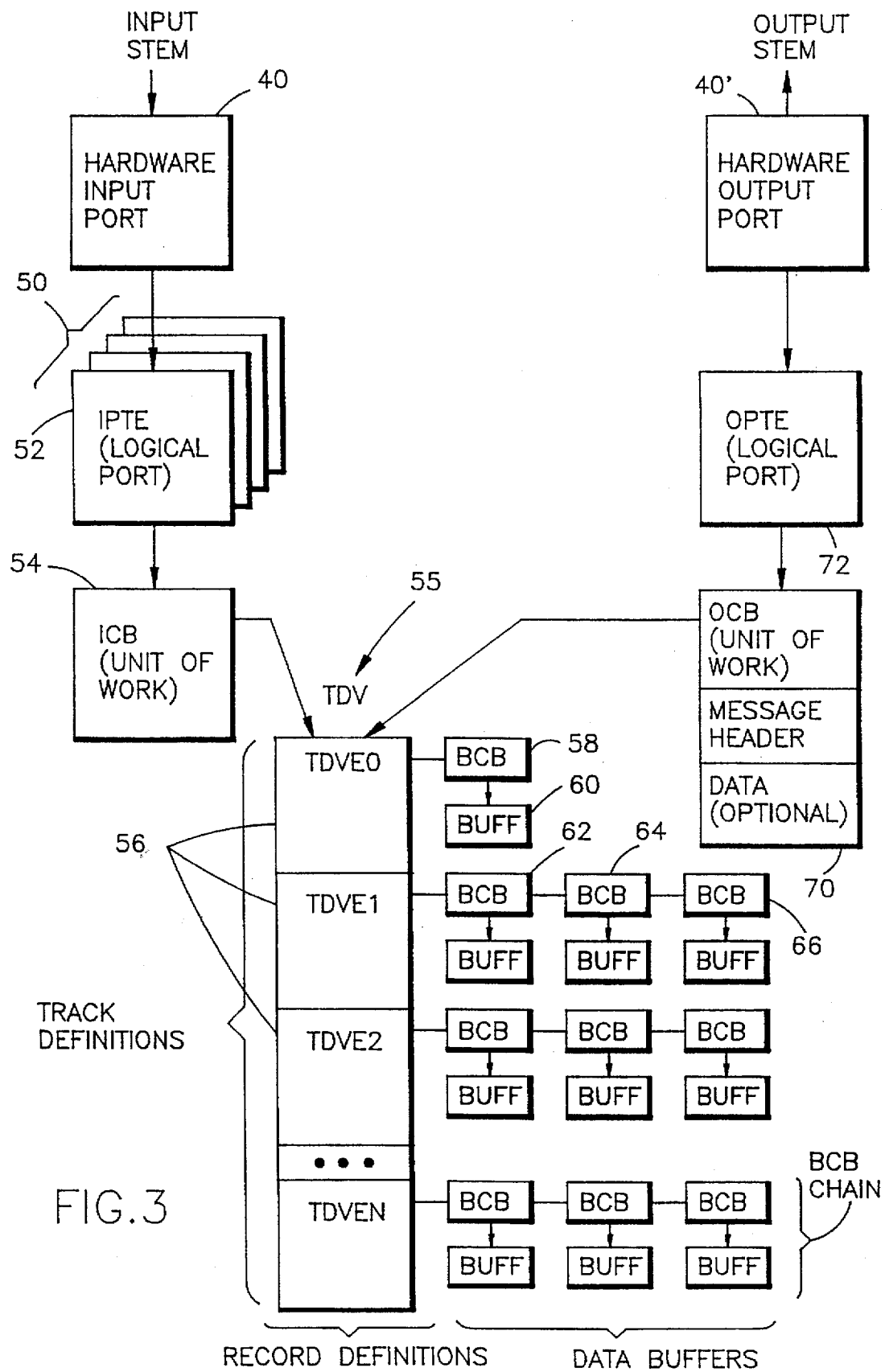
FIG. 3 is a diagram showing hardware and software that is responsive to a chained series of control blocks to access of data from a disk drive and to provide the accessed data to a host processor.

To better understand the invention, a description will hereafter be provided of the control data structures that are employed in the node of FIG. 2 to enable accomplishment of a data processing action. In FIG. 3, a combined hardware/software block diagram illustrates major control structures which enable both data reads and data writes to be accomplished to disk drives connected to the node.

Referring to FIG. 3, each node includes both an input stem and an output stem that, respectively, are employed to handle incoming data messages and outgoing data messages. The input stem includes a hardware input port 40 which is matched by an equivalent hardware output port 40' in the output stem. Hardware input port 40 is a physical entity that is used to manage processing and storage of in bound messages to a node. Each hardware input (and output) port has a set of associated hardware registers (not shown) which receive control data from various control blocks to be hereafter described. When all of the requisite control data is inserted into the hardware input/output port registers, a particular macroscopic data processing action can then be accomplished—using the control data present in the registers.

Hardware input port 40 is associated with an input port table 50 that lists many logical input ports assigned to the hardware input port. Each logical port is defined by an input port table entry (IPTE) 52, a portion of whose data structure is shown in Table 1 below.

INPUT PORT TABLE ENTRY (IPTE)
FIRST ICB
LAST ICB
FLAGS
TAG 1
POINTER TO OUTPUT HARDWARE PORT
POINTER TO OUTPUT LOGICAL PORT

TABLE 1

An IPTE 52 includes a designation of a first input control block (ICB) required to commence a data processing action (e.g. a read from memory), and a designation of the last input control block (ICB) that terminates the data processing action. Intermediate input control blocks are determined by chaining values contained within the individual control blocks. ICBs describe a data processing function and enable location of data to be processed. An IPTE 52 further includes: various flags which define interrupt conditions, status states, response states, etc; a "Tag 1" value; and pointers to both output hardware port 40' and a logical output port.

IPTE 52 is, itself, a control block as are all of the data structures to be described below. Each control block that is assigned to accomplish an action that is part of an overall macroscopic data processing action, is assigned a "tag 1" value. All control blocks assigned by the software to accomplish the specific action are assigned an identical tag 1 value.

The system thereafter is enabled to determine, simply by checking tag 1 values in succeeding control blocks, whether or not a subsequently received control block is properly associated with a chain of control blocks needed to accomplish the data processing action. If not, an error determination is immediately generated and enables the system to immediately take action to recover from the error state (e.g. via an interrupt procedure).

When an input message is received by hardware input port 40, depending upon the required data processing action, a series of ICBs 54 (FIG. 3) are assigned by the software to enable the execution of the required action. The data structure of relevant portions of an ICB is shown in Table 2 below.

INPUT CONTROL BLOCK (ICB)
   NEXT ICB POINTER
   FLAGS (e.g. ENABLE COMPLETION INTERRUPT)
   TAG 1
   SECTOR LENGTH
   SECTOR COUNT
   START TDVE
   END TDVE

TABLE 2

Each ICB 54 includes a next ICB pointer which is an address value of a next ICB data structure. It is this next ICB pointer value which accomplishes a chaining action between ICBs. The pointer to the first ICB, as above indicated, is contained in an IPTE 52. When the first ICB is accessed through use of that pointer, all ICBs associated with the macroscopic data processing action can then be determined by succeeding ICB pointers that are included in ICBs that are chained. As above indicated, an ICB contains data necessary to locate required data from a track on a disk within the node. More specifically, an ICB defines, by virtue of various flags contained within it, a particular data processing action (e.g. a data read) to be performed. An ICB further includes information that enables location of data within a disk drive track, i.e. sector length, sector count and a "track descriptor vector" pointer (TDV). A TDV 55 (see FIG. 3) is a control block which describes a particular track on a disk drive that is required by the data processing action. A TDVE 56 is a fixed format description of a record on a disk.

In addition to a start TDVE pointer, an ICB also include an end TDVE pointer so that all records required for the macroscopic ICB action are identified by data within or accessible from the ICB. Further control data is present in an ICB, but is not relevant to the invention described herein.

As above indicated, each ICB includes a pointer to a start TDVE 56. The TDVE data structure is illustrated in Table 3 below and contains a description of a record on a track.

TRACK DESCRIPTOR VECTOR ELEMENT (TDVE)
   FIELD 1 DATA ID (e.g. COUNT)
   FIELD 2 LENGTH (e.g. KEY)
   FIELD 3 LENGTH (e.g. DATA)
   FLAGS
   FIRST BCB
   TAG 1
   TAG 2
   RECORD NO

TABLE 3

Assuming that records on a disk track are arranged using the known "Count, Key, Data" arrangement, a TDVE data structure will include field descriptors for each of the Count, Key and Data fields. The Count key field will include the record count number that occurs in field 1 of the record; the field 2 value will include the length of the record name (i.e., the Key); and the field 3 value will indicate the length of data in the data portion of the disk record.

As with other control blocks (remembering that each TDVE is a control block), flags are included in a TDVE which define interrupt states, control states, etc. A TDVE further include a pointer to a first buffer control block (BCB). A BCB includes control data to enable set up and assignment of physical buffer space to be employed during a data transfer action.

The TDVE next includes a tag 1 value (as aforedescribed) and also a tag 2 value. To understand the use of a tag 2 value, it is worthwhile to refer back to Table 2 wherein it is indicated that each ICB has a start TDVE pointer. An ICB may thus designate plural records from a track on a disk, each record defined by a separate TDVE. To avoid requiring pointers between succeeding TDVEs designated by a single ICB, those TDVEs are invariably present in storage in contiguous, sequential storage positions. Thus, by having a start TDVE pointer and an end TDVE pointer, an ICB defines a span of data from memory that describes a portion of a track (i.e. contiguous records) to be accessed. As a result, all TDVEs between a start TDVE value and an end TDVE value are assigned the same tag 1 value. However, each of the TDVEs in the sequence is assigned a tag 2 value which is sequentially incremented (or otherwise logically related) so as to enable identification and matching of succeeding BCBs. The tag 2 value enables control block association to be carried on, even though there is no specific pointer between succeeding TDVEs that are designated by an ICB. The interrelationship of the various tags will become more apparent during a description of FIG. 4, however, additional control block structures will be considered first.

As indicated above, each TDVE 56 includes a pointer to a first buffer control block (BCB) 58 that defines what portion of memory should be allocated as a buffer to the data processing action. A BCB data structure is shown in Table 4 below.

BUFFER CONTROL BLOCK
   NEXT BCB POINTER
   DATA BYTES IN BUFFER
   TAG ½
   BUFFER SIZE
   FLAGS
   BUFFER ADDRESS

TABLE 4

A BCB 58 data structure commences with a pointer to a next BCB, it being realized that plural buffer locations may be allocated to a data write/data read operation. Referring back to FIG. 3, assume that an ICB 54 includes a pointer to TDVE 0 which defines a first record required to accomplish a read/write action. Recall that ICB 54 includes both a start TDVE pointer and an end TDVE pointer which, in the case shown in FIG. 3, is TDVE N. Each TDVE further includes a pointer to a buffer control block 58 that defines the amount of buffer space 60 required to store the data record. Other TDVEs may include a pointer to plural chained BCBs 62, 64, 66, which define additional buffer areas within memory to be allocated.

Returning to Table 4, each BCB includes a next BCB pointer than enables a chaining of BCBs. A next value in a BCB data structure defines the number of data bytes to be stored in physical buffer space. A further entry is a tag 1 or a tag 2 value. If only one TDVE is pointed to by an ICB, then a tag 1 value is inserted in the BCB. If plural TDVEs are pointed to by an ICB, then tag 2 values are assigned to BCBs which are chained from each respective TDVE. For instance, BCB 62 in FIG. 4 would have a tag value 2A assigned; BCB 64 a tag value 2A, etc. Each BCB data structure further includes a designation of the required buffer size, flags for various control functions and the address of the first buffer address in the buffer memory.

Two additional control block structures are employed to complete the software control functions, i.e., an output control block (OCB) 70 and an output port table entry (OPTE) 72. These control block data structures are illustrated in Tables 5 and 6 and enable each unit of data accessed from disk to be provided at output port 40' (FIG. 3).

OUTPUT CONTROL BLOCK (OCB)
NEXT OCB POINTER
START TDVE
END TDVE
FLAGS
TAG 1
DESTINATION ADDRESS
LOGICAL INPUT PORT ADDRESS AT DEST.
MESSAGE DATA (FOR CONTROL)

TABLE 5

OUTPUT PORT TABLE ENTRY (OPTE)
START OF OCB CHAIN
END OF OCB CHAIN
FLAGS
NEXT OPTE
INPUT PHYSICAL PORT
INPUT LOGICAL PORT

TABLE 6

An OCB 70 data structure (Table 5) includes a pointer to a next OCB. It also includes a start TDVE pointer and an end TDVE pointer that enable identification of data stored in various buffers to be accessed, using the BCB pointers contained in each pointed-to TDVE and intermediate TDVEs. Next, flags are included which define various control functions and interrupt states. A tag 1 value entry enables, as before, association of the OCB with a particular series of control blocks assigned to a macroscopic function.

An OCB 70 further includes a destination address for the data and a logical input port address at the destination where the data is to be directed. Under certain circumstances, an OCB 70 may also include message data to enable control information to be transmitted to a destination address.

Table 6 illustrates an OPTE 72 data structure which is substantially similar to an IPTE 52 but with reference to OCBs that are chained to provide the outgoing data. An OPTE includes a pointer to a start of the OCB chain and a pointer to the end of the OCB chain. Flags are included which define interrupt states and other control functions. An OPTE also includes a pointer to a next OPTE so as to enable a chained series of OPTEs to be fed to the output. Pointers are also included the input physical port and the input logical port and are used for functions unrelated to this invention.

Figure 4:
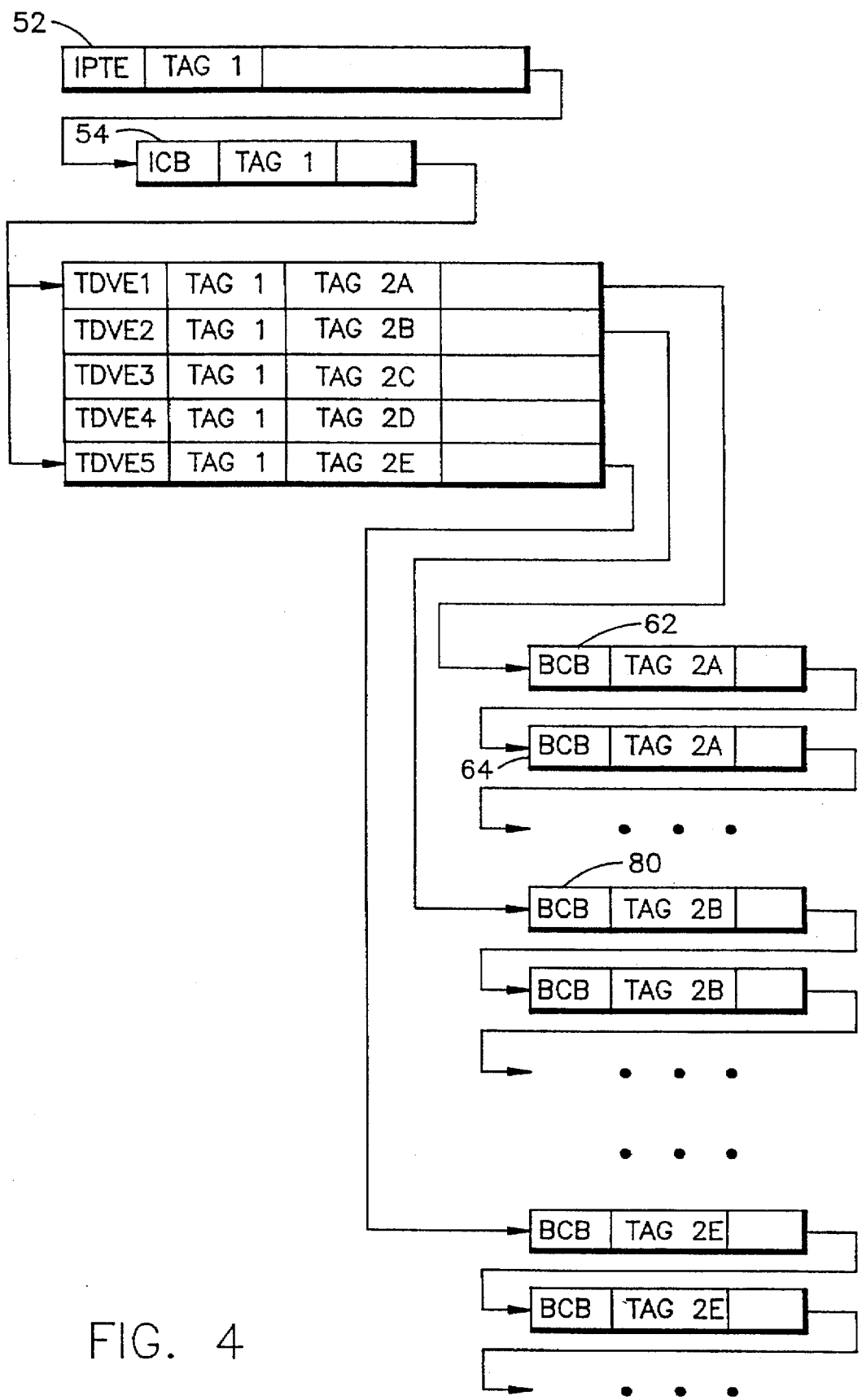
FIG. 4 is a block diagram which illustrates how control blocks are chained to perform a data processing procedure and are tied together by tag values that enable error states to be determined.

Turning now to FIG. 4, the operation of the invention will be described, as it employs the control block structures described above. As indicated, when a data processing action is to be accomplished by the node, software assigns a series of control blocks to enable the performance of the macroscopic action. As each control block is built and processed, it's data is fed to registers within either hardware input port 40 or hardware output port 40', as the case may be, to enable those registers to manifest control signals that enable execution of the data processing action. During handling of the control blocks, the tag 1 and tag 2 values are employed to assure that succeeding control blocks are associated with the same data processing action and that no errant or misdirected control block enters into the chain.

An IPTE 52 (see FIG. 3) which, as above described, describes how input port 40 is to be set up is the first control block. A tag 1 value is assigned to IPTE 52. IPTE 52 includes a pointer to ICB 52 that describes the particular data processing action to be performed. ICB 54 also has a tag 1 value assigned. Thus, when microprocessor 22 (FIG. 2) accesses ICB 54 using the pointer contained in IPTE 52, it immediately knows that ICB 54 is properly included in the control block chain for the data processing action by matching the tag 1 values.

Next, ICB 54 includes a pointer to TDVE 1 which defines the record in a track to be accessed. As above indicated, an ICB can require a number of TDVEs to accomplish its function. Such TDVEs are contiguously stored and include a tag 1 value to enable a chaining identification to be made which assures that each of TDVEs 1–5 is properly in the chain of control blocks required for the data processing action.

Each TDVE further includes a tag 2 value which enables a chaining error between a TDVE and a BCB to be determined. The tag 2 values may be incremental or may be otherwise functionally related. As shown in FIG. 4, TDVE 1 includes a tag 2A value which is duplicated in BCB 62 pointed to by a pointer in TDVE 1. Each BCB that is chained therefrom e.g., BCB 64 also includes a tag 2A value so that, as succeeding BCBs are accessed, comparison of the tag 2A values (with a found match) indicates that the sequentially accessed BCBs are properly within the control block chain. Note that TDVE 2 includes a tag 2B value which is duplicated in pointed-to BCB 80. Through the above described action, microprocessor 22 assures that succeeding control blocks that are accessed, properly belong within a chain of control blocks required to accomplish the prescribed data processing action. Any mismatch in tag values between succeeding control blocks immediately indicates an erroneous control block and microprocessor 22 responds by issuing an error notice.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for enabling a data processing system to perform a data processing procedure which employs control blocks, a control block comprising a data structure that defines at least one control parameter for a data processing action that is required to accomplish the data processing procedure, plural control blocks assigned to said data processing procedure to enable performance thereof, each of said plural control blocks having a first common tag value, said method comprising the steps:

commencing said data processing procedure by accessing each of said plural assigned control blocks in a sequence; and identifying an existence of a chaining fault by comparing said first common tag values contained in sequentially accessed control blocks of said data processing procedure to determine if a match exists therebetween and, if yes, continuing execution of said data processing procedure and, if no, signalling an anomaly arising from said chaining fault in said data processing procedure.

2. The data processing method recited in claim 1, wherein said signalling results in a generation of an interrupt in said data processing system.

3. The data processing method recited in claim 1 wherein each said control block includes a pointer to a succeeding control block that is next in said sequence, one said control block referring to a span of control block entities that are stored contiguously in memory, each of said control block entities in said span including pointers to further control blocks, said one said control block including a first common tag value, each of said control block entities in said span including both a first common tag value and a second tag value, each said further control block including a second tag value to enable said comparing step to match second tag values to assure proper control block sequencing.

4. The data processing method as recited in claim 3 wherein each of said control block entities in said span contains a different second tag value, a further control block pointed to by a pointer in one of said control block entities including a same second tag value as is present in a control block entity which includes a pointer thereto.

5. The data processing method as recited in claim 4 wherein said second tag values in said span of control block entities exhibit a sequence of differing values.

6. In a computing system including multiple software-created control blocks that are connected by pointers, each said control block including a control parameter for controlling a data processing procedure, said computing system comprising:

hardware port means controlled by control blocks;

memory means for storing said control blocks, each control block including a tag value, plural control blocks associated with a data processing procedure including a same tag value; and processor means for identifying existence of a chaining fault by sequentially accessing control blocks associated with said data processing procedure and examining tag values from sequentially accessed control blocks so as to determine an identity or lack of identity of said tag values, a lack of identity causing said processor means to report a failure in a tag check and a resultant chaining fault.

7. A computer system as recited in claim 6 wherein a second control block includes first and second tag values, said second control block accessed by said processor means in sequence after a first control block and before one or more third control blocks, said processor means employing said first tag value for checking a linkage between said first control block and said second control block and said second tag value for checking a linkage between said second control block and said third control block(s).

8. A computer system as recited in claim 7 wherein plural second control blocks are stored contiguously in said memory means, each of said second control blocks including a different second tag value which is duplicated in a third control block that is pointed at by a pointer value in a said second control block.

9. A computer system as recited in claim 8 wherein each said first control block defines a microscopic data processing action and each said second control block defines a record in said memory means which is to be subjected to said microscopic data processing action.

10. A computer system as recited in claim 9 wherein said memory means including a disk drive and said second control blocks define records stored on said disk drive.

* * * * *